No. 746,325. PATENTED DEC. 8, 1903.
C. A. HAAS, W. B. KNIGHT & B. KOCHS.
MACHINE FOR MAKING FOLDING PARTITION PACKING FOR SHIPPING BOXES.
APPLICATION FILED JULY 12, 1902.
NO MODEL.
5 SHEETS—SHEET 1.
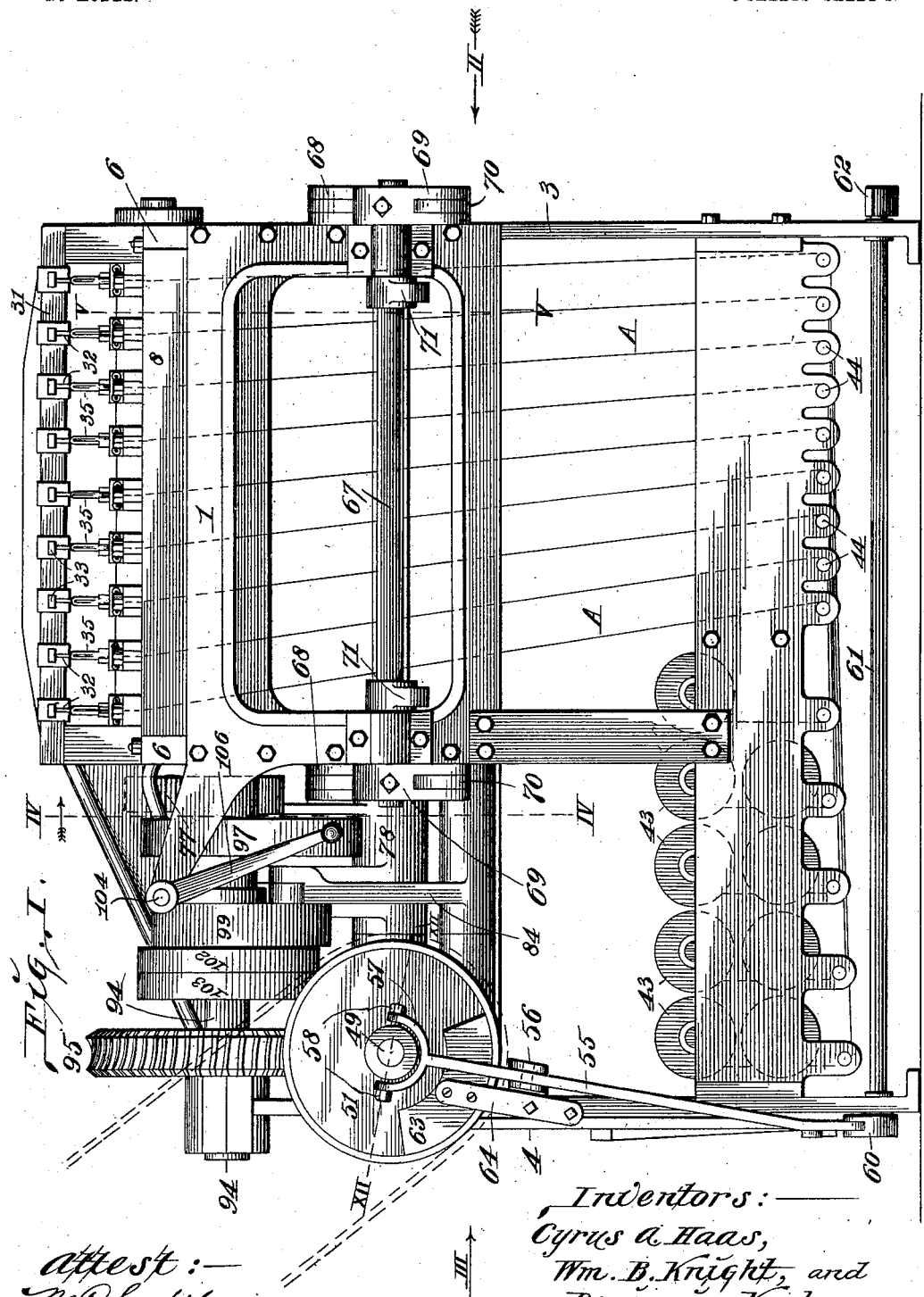

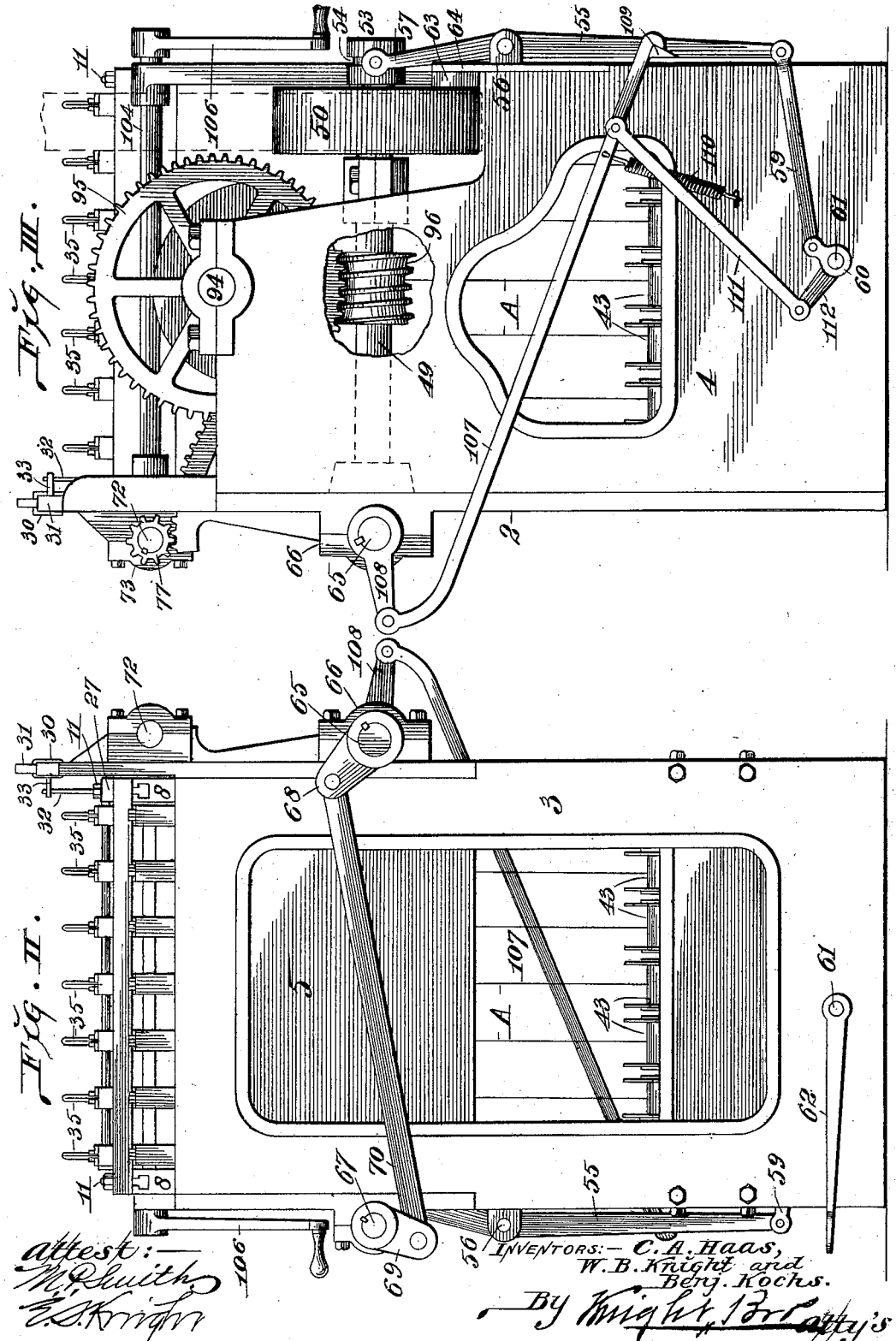

No. 746,325. PATENTED DEC. 8, 1903.
C. A. HAAS, W. B. KNIGHT & B. KOCHS.
MACHINE FOR MAKING FOLDING PARTITION PACKING FOR
SHIPPING BOXES.
APPLICATION FILED JULY 12, 1902.
NO MODEL. 5 SHEETS—SHEET 3.
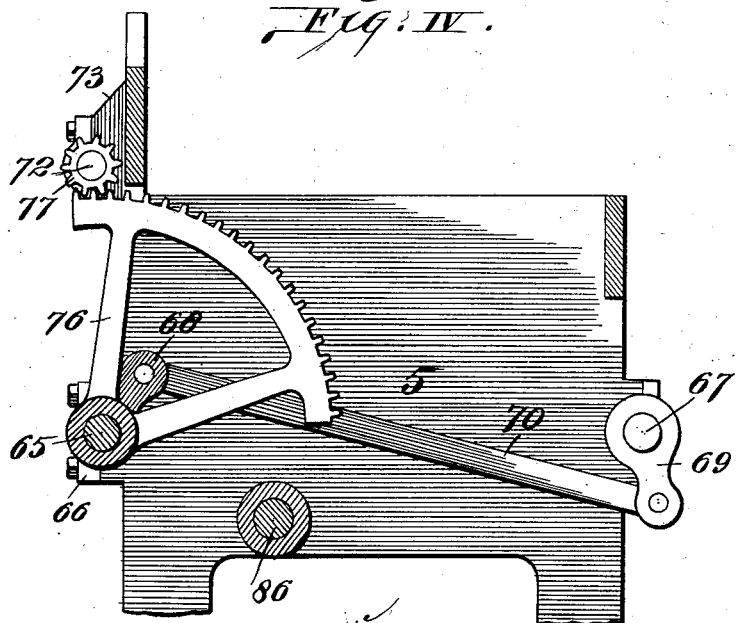
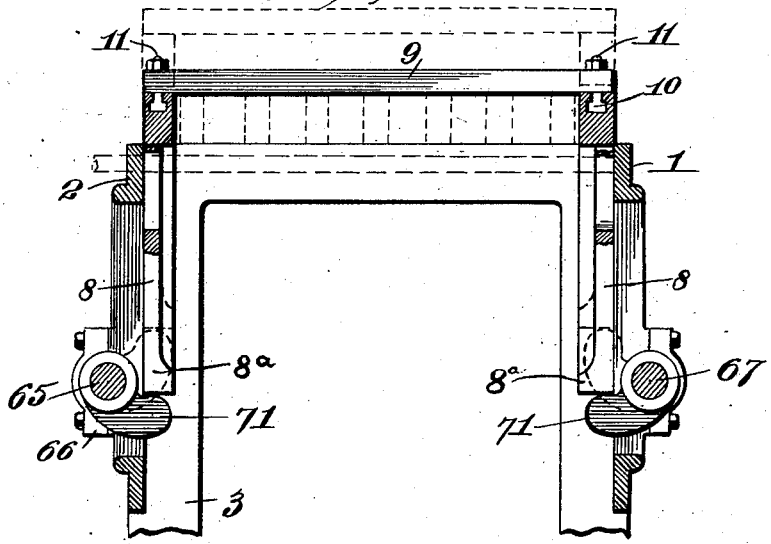

No. 746,325. PATENTED DEC. 8, 1903.
C. A. HAAS, W. B. KNIGHT & B. KOCHS.
MACHINE FOR MAKING FOLDING PARTITION PACKING FOR
SHIPPING BOXES.
APPLICATION FILED JULY 12, 1902.
NO MODEL. 5 SHEETS—SHEET 4.
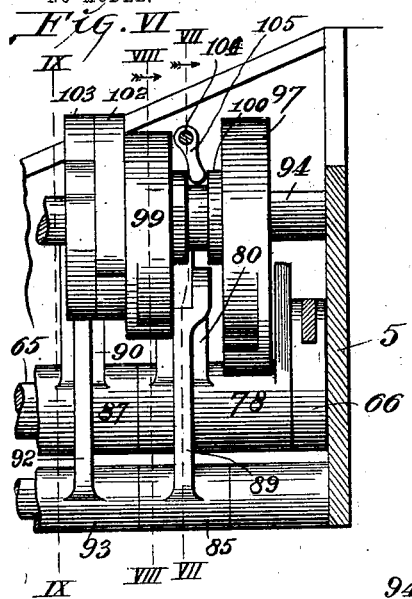
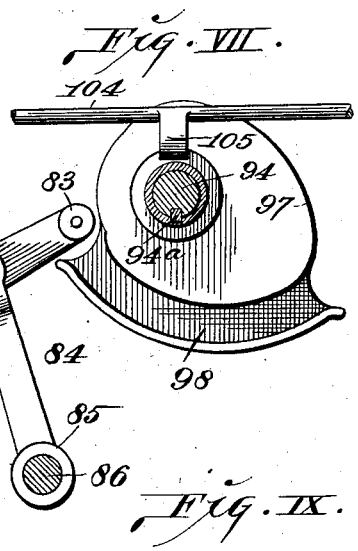
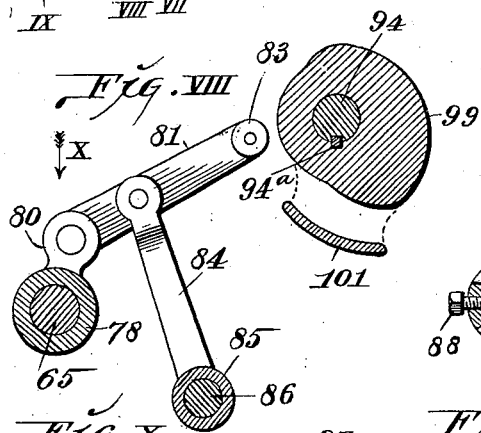
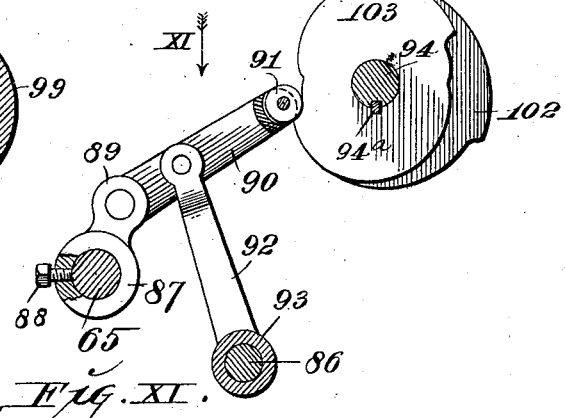
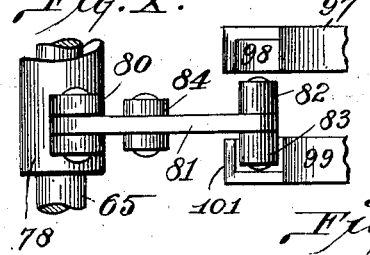
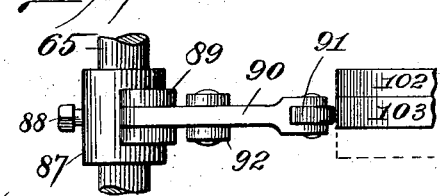
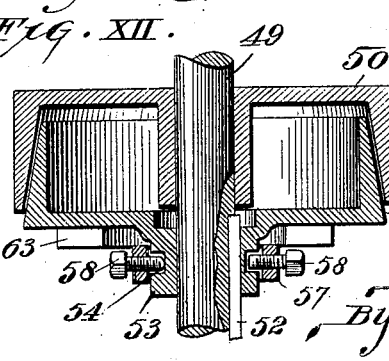

No. 746,325. PATENTED DEC. 8, 1903.
C. A. HAAS, W. B. KNIGHT & B. KOCHS.
MACHINE FOR MAKING FOLDING PARTITION PACKING FOR
SHIPPING BOXES.
APPLICATION FILED JULY 12, 1902.
NO MODEL. 5 SHEETS—SHEET 5.
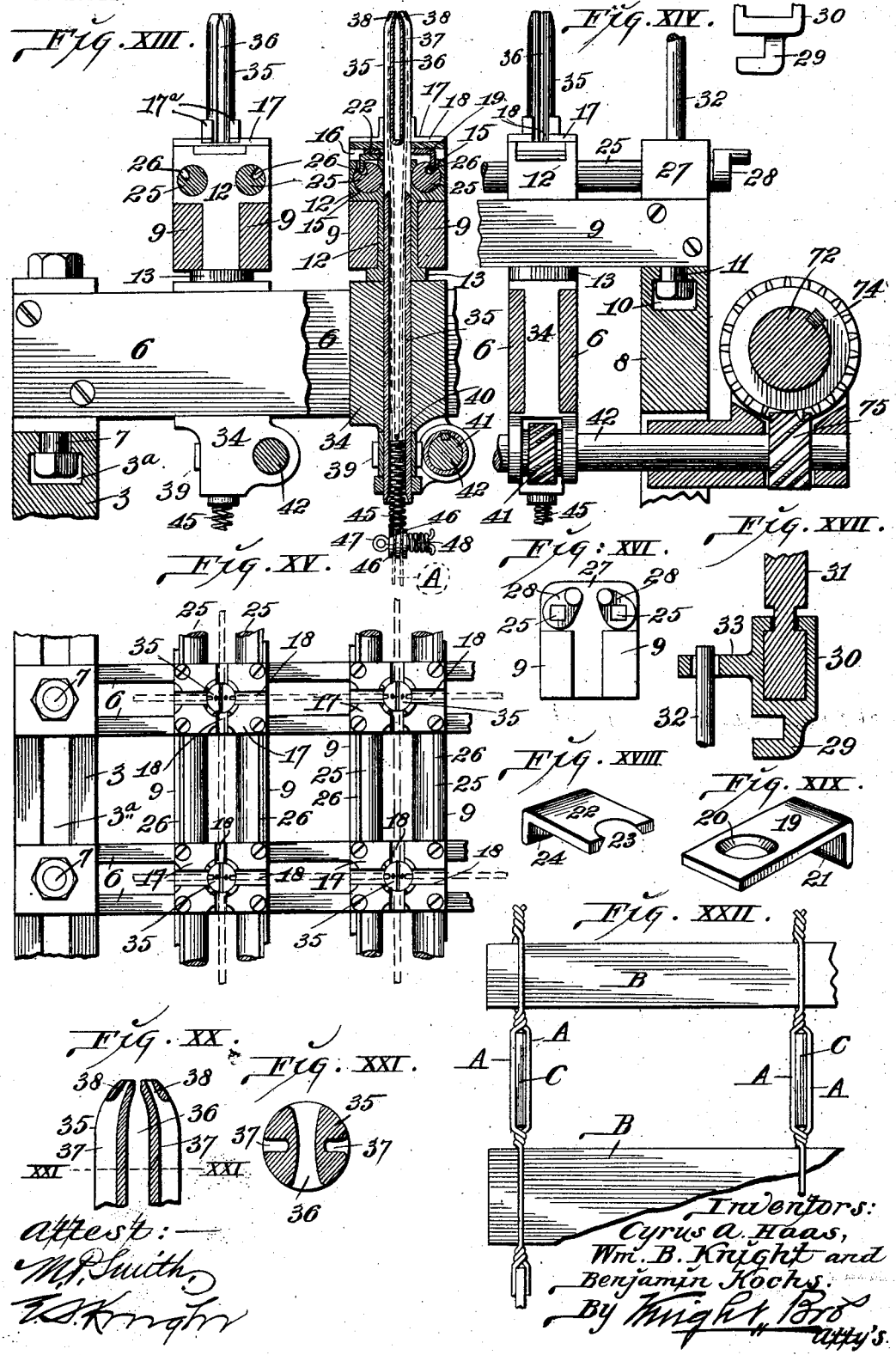

No. 746,325. Patented December 8, 1903.

UNITED STATES PATENT OFFICE.

CYRUS A. HAAS, WILLIAM B. KNIGHT, AND BENJAMIN KOCHS, OF ST. LOUIS, MISSOURI, ASSIGNORS TO SCHOENTHALER MANUFACTURING COMPANY, OF ST. LOUIS, MISSOURI, A CORPORATION.

MACHINE FOR MAKING FOLDING PARTITION-PACKING FOR SHIPPING-BOXES.

SPECIFICATION forming part of Letters Patent No. 746,325, dated December 8, 1903.

Application filed July 12, 1902. Serial No. 115,345. (No model.)

*To all whom it may concern:*

Be it known that we, CYRUS A. HAAS, WILLIAM B. KNIGHT, and BENJAMIN KOCHS, citizens of the United States, residing in the city of St. Louis, in the State of Missouri, have invented a certain new and useful Improvement in Machines for Making Folding Partition-Packing for Shipping-Boxes, of which the following is a full, clear, and exact description, reference being had to the accompanying drawings, forming part of this specification.

Our invention relates to a machine for manufacturing folding partition-packings composed of veneer strips joined together by wires of the nature set forth in Letters Patent of the United States issued to the Schoenthaler Manufacturing Company March 29, 1898, No. 601,571.

The invention consists of features of novelty hereinafter fully described, and pointed out in the claims.

Figure I is a side elevation of the machine. Fig. II is an end elevation looking at the right-hand end of the machine as shown in Fig. I. Fig. III is an end elevation of the machine looking at the left-hand end as seen in Fig. I. Fig. IV is an elevation of the rocking mechanism, through the medium of which the rotating spindles are operated, parts being shown in vertical section taken on line IV IV, Fig. I. Fig. V is an elevation illustrating the table-lifting mechanism, parts being shown in vertical section, taken on line V V, Fig. I. Fig. VI is a view of the cam mechanism of the machine. Fig. VII is a view of the cam and rock-shaft-operating mechanism, partly in section, taken on line VII VII, Fig. VI, through the medium of which the long twist of the wires of the packing is accomplished. Fig. VIII is a view, partly in section, on line VIII VIII, Fig. VI, and partly in elevation, of the cam and parts operated thereby, through the medium of which the short twists of the packing-strip wires are produced. Fig. IX is a view, partly in elevation and partly in section, on line IX IX, Fig. VI, of the cams and parts operated thereby, through the medium of which the table of the machine is elevated. Fig. X is a top view of the parts shown in Fig. VIII. Fig. XI is a top view of the parts shown in Fig. IX. Fig. XII is a cross-sectional view taken on line XII XII, Fig. I, through the friction-driving mechanism of the machine. Fig. XIII is a view, partly in elevation and partly in vertical section, of the machine-frame, table, and strip-receiving and wire-twisting spindles. Figs. XIV is a view, partly in elevation and partly in section, of the machine-frame, table, and one of the spindles and the spindle-operating mechanism. Fig. XV is a top or plan view of part of the table of the machine. Fig. XVI is an end view of one of the spindle-receiving bars, showing the operating-cranks of the wire-cutters. Fig. XVII is a vertical section through one of the cutter-rock-shaft-operating blocks and shows one of the table-guide pins. Figs. XVIII and XIX are perspective views of the coöperating cutters by which the packing binding-wires are cut subsequent to the binding of the packing. Fig. XX is a view of the upper end of one of the spindles of the machine. Fig. XXI is a cross-section taken on line XXI XXI, Fig. XX. Fig. XXII is a view of a fragment of a packing such as produced in our machine.

1 designates the front wall, 2 the rear wall, and 3 and 4 the end walls, of the frame of our machine.

5 is a vertical tie-support intermediate of the end walls of the machine-frame. The walls 3 and 4 are grooved, as seen at 3ª, Fig. XIII, and mounted on said walls are a series of pairs of longitudinal bars 6, preferably arranged on edge. The pairs of longitudinal bars 6 are united and are adjustably held on the end walls of the machine-frame by bolts 7, the heads of which are seated in the grooves in the end walls and which extend vertically between each pair of longitudinal bars, as seen in Fig. XIII. By adjustably securing the bars 6 they may be moved either forwardly or backwardly to space them the proper distances apart. Vertically movable within the frame of the machine between the front and rear walls 1 and 2, the end wall 3, and the tie-support 5 is a table composed of front and rear frames 8 and transverse cross-bars 9. The table-frames 8 are provided in their upper edges with grooves 10, that receive bolts 11, (see Fig. XIV,) by which the transverse cross-bars 9 are adjustably held in pairs to the frames, thereby providing for the spacing of the transverse cross-bars in pairs on the table-frame above the longitudinal bars 6. The table composed, as stated, of the parts 8 and 9 is adapted to be raised and lowered, and the mechanism for accomplishing such movement will be hereinafter stated.

12 designates spindle-boxes seated between the transverse bars 9 (see Fig. XIII) at their intersection with the longitudinal bars 6, each box being provided with an annular rim 13 at its lower end, that projects beneath the pair of transverse bars in which it is located. At the upper ends of the boxes 12 are heads that are provided with sockets 15. The upper ends of the boxes 12 are recessed at 16, (see Fig. XIII,) and mounted on each head is an apertured cap 17, that is provided with longitudinal and transverse grooves 18 in its surface situated between lugs 17$^a$. Located in the recesses 16 of the box-heads are cutters 19 and 22, that are adapted to be moved toward each other for the purpose of cutting the binding-wires of the packing in the manner to be hereinafter stated in connection with the operation of the machine. The cutters 19 (see Figs. XIII and XIX) are provided with a knife-edge aperture 20 and a downturned lip 21. The cutters 22 are provided with a semicircular knife-edge 23 and a downturned lip 24. (See Figs. XIII and XVIII.)

25 designates rocking rods seated in the sockets 15 of the spindle bearing-boxes 12 and provided with grooves 26, which receive the lips 21 and 24 of the cutters 19 and 22 to provide for the actuation of said cutters in the rocking of said rods to actuate them toward each other for cutting action. The rocking rods 25 are journaled in the separating bearing-blocks 27 at their rear ends, and on each rod is a crank-arm 28. On the elevation of the table of the machine the crank-arms 28 are moved against the downwardly-projecting fingers 29 of finger-blocks 30, (see Figs. XIV and XVII,) which are adjustably positioned on a longitudinal bar 31, supported above the rear wall of the frame of the machine, as seen in Fig. I. The finger-blocks 30 are held above the crank-arms in the proper relation thereto by guide-pins 32, which surmount the blocks 27 and extend through apertured arms 33, carried by the finger-blocks. (See Fig. XVII.)

34 designates lower bearing-boxes at intervals between the pairs of longitudinal bars 6 at the intersections of said bars and the transverse bars 9, each bearing-box 34 being vertically apertured in line with the adjacent spindle bearing-box 12 immediately above it.

35 designates packing-strip and binding-wire spindles, tubular from their lower ends upwardly to their heads, that are positioned in the bearing-boxes 34 and 12 and extend upwardly through the caps 17 on the boxes 12. The heads of the spindles are provided with longitudinal slots 36 and contain longitudinal grooves 37. The slots 36 in the spindles provide yielding tongues, between which the packing-strips are introduced and out of which they are carried through the contracted upper ends of the spindle-heads, thus furnishing contracted mouths that open to permit the removal of the strips and partially close after the strips have passed therethrough. The spindle-grooves 37 terminate in eyes 38, that receive the binding-wires of the packing, which pass upwardly through the tubular portions of the spindles and their grooves. The eyes 38 are extended at angles to each other through the spindles, so as to approach each other on converging lines in order that the binding-wires passing therethrough will cross each other. The spindles 35 are adapted to rotate in the bearing-boxes 12 and 34, and motion is imparted to them through the medium of spiral pinions 39, fixed to the spindles by pins 40, (see Fig. XIII,) each pinion being driven by a spiral gear 41 on a shaft 42, mounted in the bearing-boxes 34. (See Figs. XIII and XIV.)

A designates the binding-wires, (see Figs. I, II, and III,) which are conducted to and through the spindles 35, and B and C are the crossing packing-strips that are bound together by said wires, which are conducted through the spindles in pairs and twisted upon the rotation of the spindles. The wires A are delivered from spools 43, having suitable bearing-supports in the front and rear frame-walls of the machine, and they pass from said spools beneath rods 44 to stretch them into straight condition for their delivery to the spindles 35. Applied to the wires A, as seen in Fig. XIII, are tension devices by which the tension of the wires passing through the spindles is governed and by which the wires are retracted to hold them from undue extension beyond the heads of the spindles after they have been cut by the actuation of the cutters 19 and 22 subsequent to the final twisting of the wires at the completion of the piece of packing. The tension devices consist of recoil-springs 45, that are seated in the lower tubular ends of the spindles 35 to rest against the cross-pins 40 therein, and a series of washers 46, applied to the wires A on split pins 47, that pass through the washers 46. On said pins are tension-springs 48, that exert pressure against said washers to hold them together on the split pin and embrace the wires A with a sufficient degree of tension to render their delivery through the spindles 35 uniform and in unkinked condition. These tension devices are of particular value in their action to maintain a taut condition of the wires A, which causes the wires to be drawn into the edges of the packing-strips, denting them in a manner to prevent their slippage within the wire loops of the packing.

49 designates the drive-shaft of the machine, mounted in suitable bearings and extending transversely of the machine. (See Figs. I and III.) This shaft is driven by a friction-gear mechanism applied thereto that will now be described.

50 is a loose pulley mounted on the shaft 49, (see Fig. XII,) the pulley being cone-shaped interiorly.

51 is a cone slidingly mounted on the drive-shaft 49, on which it is held for rotation by a feather 52. The hub 53 of the cone is provided with a groove 54.

55 is a shaft-bar pivoted to the machine-frame at 56 (see Figs. I, II, and III) and provided with fork-arms 57, in which screws 58 are seated, the inner ends of which are positioned in the groove 54 of the cone-hub 53.

59 is a link hinged at one end to the lower end of the shifter-bar 55 and connected at its opposite end at a crank-arm 60 on a rock-shaft 61, that is journaled in the end walls of the machine-frame and has fixed to it a treadle 62, by which it may be rocked to actuate the shifter-bar 55 for the purpose of moving the cone 51 into or out of frictional contact with the loose pulley 50.

63 is a brake-shoe adapted to bear against the face of the cone 51 to retard the rotation thereof and stop its motion and that of the drive-shaft on the cone being thrown out of gear with the loose pulley 50. The brake-shoe is supported by a bar 64, attached to the end frame-wall 4 of the machine.

65 designates a rock-shaft mounted in bearing-boxes 66 at the rear of the machine, said rock-shaft being connected at the ends to a second rock-shaft 67 at the front of the machine by means of cranks 68 and 69, that are united by connecting-links 70, so that movement of the first-named rock-shaft may be transmitted to the last named. Fixed to the rock-shafts 65 and 67 are cam fingers 71, (see Figs. I and V,) that occupy positions beneath the legs 8ª of the table-frames 8. On the rocking of said shafts by means to be hereinafter described the cam-fingers 71 are moved upwardly and act to raise the table of the machine, including the cross-bars 9, forming a part thereof.

72 (see Figs. II, III, and IV) designates a driven shaft mounted in bearing-boxes 73 upon the rear of the machine-frame. Fixed to the shaft 72 are a series of spiral gears 74 (see Fig. XIV) corresponding in number to the number of rows of the spindles 35. The spiral gears 74 are arranged in mesh with spiral gears 75 on the outer ends of the shafts 42, through the medium of which rotation is transmitted from said driven shaft 72 to all of the series of shafts 42 to impart rotation to the spindles 35 through the medium of the spiral gears 41 and the spiral pinions 39, the latter of which are fixed to the spindles, as explained.

76 (see Figs. III and IV) designates a cogged segment loosely mounted on the rock-shaft 65 and having its teeth arranged in mesh with a pinion 77, fixed to the shaft 72 above said segment and through the medium of which rotation is imparted to said shaft 72, from which it is transmitted to rotate the spindles 35.

78 (see Figs. I, VI, VII, and VIII) designates a sleeve loosely mounted on the rock-shaft 65 beside the hub of the cogged segment 76. Projecting from the rocking sleeve 78 is an ear 80, in which is pivotally seated a cam-actuated arm 81. The free end of said arm 81 projects forwardly and carries a pair of rollers 82 and 83. The arm is pivoted to and supported by a guide-arm 84, the hub 85 of which is loosely mounted upon a short shaft 86, seated in the end frame-wall 4 of the machine and the tie-support 5.

87 is a rocking sleeve fixed to the rock-shaft 65 by a set-screw 88 beside the rocking sleeve 78. (See Figs. IX and XI.) The rocking sleeve 87 is provided with an ear 89, in which is pivotally mounted a pusher-arm 90, the free end of which projects forwardly and has journaled in it a roller 91.

92 is a guide-arm pivoted to the pusher-arm 90 and having its hub loosely mounted on the shaft 86.

94 (see Figs. I and III) designates a cam-shaft mounted in bearings above the drive-shaft 49 and extending transversely to said drive-shaft. Fixed to the cam-shaft 94 is a worm-wheel 95, that is arranged in mesh with a worm 96, fixed to the drive-shaft 49, through the medium of which rotation is imparted to said cam-shaft. On the cam-shaft 94 is a long wire twist-cam 97, (see Figs. I, VI, and VII,) against which the roller 82 of the cam-actuated arm 81 is adapted to bear in the operation of said arm to rock the sleeve 78 and impart rocking motion to the cogged segment 76. The cam 97 is provided with a flanged web 98, within which the roller 82 of the arm 81 is adapted to move and which serves to return the arm 81 and cogged segment after they have been rocked in a rearward direction. On the return stroke of these parts the twisting of the wires A beneath the spindles 35, that is caused by the forward movement, is overcome.

99 (see Figs. I, VI, and VIII) designates a short wire twist-cam that is rigid with the cam 97, being connected thereto by a grooved collar 100. The cam 99 is adapted to receive the roller 83, carried by the arm 81, when the roller 82, also carried by the arm, is out of bearing with the long twist-cam 97. The cam 99 is provided with a flanged web 101, in which the roller 83 operates for the return of the arm 81 after the cogged segment has been rocked rearwardly. By the short twist-cam 99 the arm 81 is actuated to rock the cogged segment 76, in mesh with the pinion 77 on the driven shaft 72, for the purpose of transmitting motion to the spindles 35 through the operation of the shafts 42. On such actuation of the spindles they rotate to produce a short twist of the binding-wires A, that are applied in loops to the packing-strips. In like manner when the arm 81 is moved out of engagement with the cam 99 and into engagement with the long twist-cam 97 and owing to the increased size of the long twist-cam greater rotation is imparted to the spindles, and consequently longer twists of the wires is produced.

102 designates a long table lift-cam that corresponds to the long twist-cam 97, and 103 is a short table lift-cam that corresponds to the short twist-cam 99. The cams 102 and 103 are rigid with the cams 97 and 99, and the roller 91 of the pusher-arm 90 is adapted to bear against the cam 102 when the roller 82 of the arm 81 is in bearing with the long twist-cam 97, whereas when the roller 83 on the pusher-arm 81 is in bearing with the short twist-cam 99 the roller 91 bears against the short lift-cam 103. The cams 97, 99, 102, and 103 are all, as stated, rigid with each other on the cam-shaft 94, and they are held from rotation on the shaft by splines 94$^a$ and are adapted for longitudinal movement on the shaft to bring the different cams into corresponding relative positions with respect to the cam-actuated arms 81 and 90.

For the purpose of slipping the cams on the shaft 94 we provide a shift-rod 104, that extends transversely of the cam-shaft and is provided with a finger 105, which occupies the groove in the collar 100 between the cams 97 and 99. The shift-rod 104 is provided with a crank 106, by which it may be actuated.

For the purpose of automatically stopping the action of the machine on the completion of the production of a piece of packing and the descent of the table of the machine we provide means by which the friction driving mechanism is automatically thrown out of gear.

107 is a trip-rod that is connected at one end to a crank-arm 108 at the end of the machine occupied by the friction driving mechanism, the opposite end of the trip-rod being connected at 109 (see Fig. III) to the shifter-bar 55, to which it is held by a spring 110, connected to the frame of the machine. The trip-rod 107 is also connected to the treadle-operated rod 61 by a link 111 on the crank-arm 112.

In the practical use of our machine the operation of producing the packing is commenced when the table of the machine is in lowered position and the transverse bars 9 of said table are at rest in a position most clearly seen in Figs. XIII and XIV. At this time the slots 36 in the spindles 35 are exposed above the spindle-bearing boxes 12, in which they operate, and the wires A, which pass through the spindles, are twisted at their upper ends above the eyes 38 of the spindles, so as to hold the wires in loops around the slots 36 of the spindles. At this time the slots 36 in the spindles are exposed above the bearing-boxes 12 and in line with the grooves in the caps 17, surmounting the bearing-boxes. The first set of packing-strips are then introduced through the slots while the spindles are at rest, so that they are positioned between the lugs 17$^a$ of the caps 17. The machine is next thrown into gear and the cams on the shaft 94 are shifted by movement of the shift-rod 104. The short lift-cam 103 is moved to the roller 91 of the pusher-arm 90, with the result that the rock-shafts 65 and 67 are rotated, due to the actuation of the pusher-arm mounted on the rock-shaft 65. On the rotation of the rock-shaft the cam-fingers 71 are moved beneath the table-legs 8$^a$ and the table is lifted, elevating the parts carried thereby, so that the packing-strips B previously introduced are moved upwardly through and out of the spindle-slots 36, in which movement they carry the wires A, that are looped about them. As soon as the packing-strips have been moved out of the spindles they are supported by the lugs 17$^a$ of the caps 17 to prevent their toppling over while the binding-wires are being twisted. Rotation of the spindles is then commenced to effect a short twist of the wires beneath the strips and finish the wire loop, the upper ends of which are formed by the twist made previous to the introduction of the packing-strips. The short twist of the wires is produced through the operation of the short twist-cam 99 against the arm 81 to actuate the cogged segment 76, from which motion is transmitted to the spindles 35 in the manner explained. The movements of the cams 99 and 103 continue until the twists of the wires have been completed, and the continuation of the movement of the cams causes the rock-shafts to be rocked in the opposite direction, causing the table of the machine to descend, the machine being thrown automatically out of gear on a half-revolution of the cams 99 and 103 and the termination of the downward movement of the table. When the operation of the machine ceases, the slots 36 in the spindles 35 are brought to rest in positions at right angles to their former positions, and the next succeeding series of strips B are introduced through the slots to cross the previously-inserted strips, as seen in Fig. XXII. The same operation to lift the strips and twist the wires is again gone through, the cogged segment 76 being rocked in the opposite direction from its previous movement and producing a twist of the wires A in the contrary direction or to the right or left of that produced in the first action. On the second stoppage of the machine the spindles are brought to rest in the same position as in the start, and the strips are inserted therethrough in a direction corresponding to the first strips. The operation thus far described is continued until the desired number of strips have been bound together in crossing directions, after which the cams on the shaft 94 are shifted for the final steps of the operation. On the shifting of the cams the long twist-cam 97 receives the roller 82 of the arm 81, and the long lift-cam 102 receives the bearing of the roller 91 of the pusher-arm 90. When the machine is operated for the last twist, the long twist-cam 97 rocks the cogged segment 76 a greater distance than the short twist-cam 99 did in the previous steps, thereby causing greater rotation of the spindles 35 and effecting a twisting of the wires of greater length, so that they may be cut in the twist with sufficient length at each side of the point of severing to leave a twisted portion on the terminations of the wires remaining in the spindles. On the completion of the long twist of the wires the long lift-cam 102 causes continued elevation of the table of the machine, with the result that the crank-arms 28, carried by the rocking rods 25, are raised to the fingers 29 of the finger-blocks 30, mounted at the top of the machine. The crank-arms 28 are thereby actuated in a rocking manner through their bearing against said fingers, and the rods 25 are rocked to reciprocate the cutters 19 and 22, which, moving toward each other, carry their knife-edges 20 and 23 from opposite directions to the wires A centrally of their long twist portions to sever the wires throughout the extent of the packing simultaneously.

We claim as our invention—

1. The combination in a machine of the character described, of a series of packing-strip and binding-wire receiving spindles, and means for rotating said spindles in varied degree to produce a short twist of the wires in one direction and a long twist of the wires in the opposite direction, substantially as set forth.

2. The combination in a machine of the character described, of a series of packing-strip and binding-wire receiving spindles, means for raising said strips out of said spindles, grooved supports carried by said strip-receiving means adapted to sustain the strips after they are elevated, and means for twisting said binding-wires, substantially as described.

3. The combination in a machine of the character described, of a series of packing-strip and binding-wire receiving spindles, means for raising said strips out of said spindles, and caps mounted on said strip-raising means provided with lugs between which said packing-strips are sustained on their removal from said spindles, and means for twisting said binding-wires, substantially as described.

4. In a machine of the character described, the combination of a frame, a table, means for elevating said table, a series of strip-receiving spindles rotatably mounted in said table and adapted to receive binding-wires, and means for rotating said spindles to produce long and short twists of the binding-wires, substantially as described.

5. In a machine of the character described, the combination of a frame, a table, means for elevating said table, a series of strip-receiving spindles rotatably mounted in said table and adapted to receive binding-wires, and means for rotating said spindles to twist the wires passing therethrough, substantially as described.

6. In a machine of the character described, the combination of a frame, a table, a series of open-headed rotative strip-receiving spindles positioned in said table and adapted to receive binding-wires, means for elevating said table to move said strips out of said spindles, and means for rotating said spindles to twist the wires passing therethrough, substantially as described.

7. In a machine of the character described, the combination of a frame, a table, a series of rotative spindles provided with strip-receiving slots, and open at their upper ends, said spindles being tubular and provided with eyes at their upper ends adapted to receive strip-binding wires, means for elevating said table to carry the strips therefrom, and means for rotating said spindles to twist said binding-wires, substantially as set forth.

8. In a machine of the character described, the combination of a frame, a table, a series of rotative strip-receiving spindles through which binding-wires are passed, means for elevating said table to move the strips out of said spindles, means for rotating said spindles to twist said binding-wires, and means for cutting said wires after they are twisted, substantially as described.

9. In a machine of the character described, the combination of a frame, a table, a series of rotative strip-receiving spindles mounted in said table, and adapted to receive binding-wires, means for elevating said table to move the strips out of said spindles, means for rotating said spindles to twist the binding-wires, and means for automatically cutting the twisted portions of said wires, substantially as described.

10. In a machine of the character described, the combination of a frame, a table, a series of strip-receiving spindles mounted in said table and adapted to receive binding-wires, means for elevating said table to move the strips out of said spindles, means for rotating said spindles to twist the binding-wires, reciprocating cutters carried by said table at the location of said spindles, and means for operating said cutters on the lifting of said table, substantially as described.

11. In a machine of the character described, the combination of a frame, a table, a series of rotative strip-receiving spindles adapted to receive binding-wires, means for elevating said table to move the strips out of said spindles, means for rotating said spindles to twist said binding-wires, rock-shafts adjacent to said spindles, cutters adapted to be operated by said rock-shafts, and means for operating said rock-shafts, substantially as described.

12. In a machine of the character described, the combination of a frame, a table, a series of rotative strip-receiving spindles adapted to receive binding-wires, means for elevating said tables to move the strips out of said spindles, means for rotating said spindles to twist said binding-wires, rock-shafts adjacent to said spindles, cutters adapted to be operated by said rock-shafts, cranks carried by said rock-shafts, and fingers having a fixed support to which said cranks are adapted to move, substantially as described.

13. In a machine of the character described, the combination of a frame, a table, a series of rotative strip-receiving spindles adapted to receive binding-wires, means for elevating said table to move the strips out of said spindles, means for rotating said spindles to twist said binding-wires, grooved rock-shafts adjacent to said spindles, cutters adapted to be operated by said rock-shafts, cranks carried by said rock-shafts, and fingers having a fixed support to which said cranks are adapted to move, substantially as described.

14. In a machine of the character described, the combination of a frame, a table, a series of rotative strip-receiving spindles adapted to receive binding-wires, means for elevating said table to move the strips out of the spindles, means for rotating said spindles to twist said binding-wires, reciprocating cutters located in proximity to said spindles, rock-shafts arranged in engagement with said cutters, finger-blocks to which said rock-shafts are adapted to be moved for their actuation, and guide-pins carried by said table adapted to operate in said finger-blocks, substantially as described.

15. In a machine of the character described, the combination of a frame, a table, a series of rotative strip-receiving spindles adapted to receive binding-wires, means for elevating said table to move the strips out of said spindles, means for rotating said spindles to twist the binding-wires, and means for holding said binding-wires under tension as they pass through said spindles, substantially as described.

16. In a machine of the character described, the combination of a frame, a table, a series of rotative strip-receiving spindles adapted to receive binding-wires, means for elevating said table to move the strips out of said spindles, means for rotating said spindles to twist the binding-wires, and means for holding said binding-wires under tension as they pass through said spindles, said tension means being seated in said spindles and clamped to said wires, substantially as described.

17. In a machine of the character described, the combination of a frame, a table, a series of rotative strip-receiving spindles adapted to receive binding-wires, means for elevating said table to move the strips out of said spindles, means for rotating said spindles to twist the binding-wires, and means for holding said binding-wires under tension as they pass through said spindles, said tension means comprising springs seated in said spindles, and spring-held washers fitted to said wires and resting against the springs seated in the spindles, substantially as described.

18. In a machine of the character described, the combination of a frame, a table, a series of rotative strip-receiving spindles adapted to receive binding-wires, means for rotating said spindles to twist said binding-wires, and rockingly-mounted cam-fingers adapted for actuating to elevate said table, substantially as described.

19. In a machine of the character described, the combination of a frame, a table, a series of rotative strip-receiving spindles adapted to receive binding-wires, means for rotating said spindles to twist said binding-wires, and means for elevating said table comprising a pair of rock-shafts and a series of cam-fingers carried by said rock-shafts, substantially as described.

20. In a machine of the character described, the combination of a frame, a table, a series of rotative strip-receiving spindles adapted to receive binding-wires, means for elevating said table, means for rotating said spindles to twist said binding-wires, and grooved caps surmounting said table and adapted to receive the strips inserted into said spindles, substantially as described.

In testimony whereof we have hereunto set our hands this 1st day of July, 1902.

CYRUS A. HAAS.
WM. B. KNIGHT.
BENJAMIN KOCHS.

In presence of—
E. S. KNIGHT,
M. P. SMITH.